US006987157B2

(12) United States Patent
Clement et al.

(10) Patent No.: US 6,987,157 B2
(45) Date of Patent: Jan. 17, 2006

(54) CERTAIN SILICONE POLYETHERS, METHODS FOR MAKING THEM AND USES

(75) Inventors: Katherine Sue Clement, Lake Jackson, TX (US); Kenneth Michael Lee, Bay City, MI (US); Lenin James Petroff, Bay City, MI (US); Wanda Wells Rauscher, Angleton, TX (US); Richard Michael Wehmeyer, Lake Jackson, TX (US); Robert Howard Whitmarsh, Lake Jackson, TX (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/041,323

(22) Filed: Jan. 7, 2002

(65) Prior Publication Data

US 2002/0120087 A1   Aug. 29, 2002

Related U.S. Application Data

(63) Continuation-in-part of application No. 09/756,440, filed on Jan. 8, 2001, now abandoned.

(51) Int. Cl.
*C08G 77/08* (2006.01)

(52) U.S. Cl. .......................... 528/15; 528/31; 556/445
(58) Field of Classification Search ............... 528/31, 528/29, 15; 556/445
See application file for complete search history.

(56) References Cited

U.S. PATENT DOCUMENTS

| | | | | |
|---|---|---|---|---|
| 3,644,535 | A | 2/1972 | Batty et al. | 260/615 B |
| 3,879,433 | A | 4/1975 | Omietanski et al. | 260/448.2 |
| 3,933,695 | A | 1/1976 | Omietanski et al. | 260/2.5 AH |
| 3,957,843 | A * | 5/1976 | Bennett | 260/448.2 B |
| 4,039,490 | A | 8/1977 | Kanner | 260/2.5 AH |
| 4,059,605 | A | 11/1977 | Bennett | 260/448.2 B |
| 4,877,906 | A | 10/1989 | Harper | 568/621 |
| 5,066,756 | A * | 11/1991 | Raleigh et al. | 528/32 |
| 5,391,679 | A | 2/1995 | Burkhart et al. | 528/27 |
| 5,856,369 | A | 1/1999 | Jorgenson et al. | 521/112 |
| 5,877,268 | A * | 3/1999 | Jorgenson et al. | 528/15 |
| 6,043,331 | A * | 3/2000 | Herzig | 528/15 |
| 6,355,845 | B1 * | 3/2002 | Clement et al. | 568/616 |
| 6,372,874 | B1 * | 4/2002 | Cameron | 528/21 |

FOREIGN PATENT DOCUMENTS

| | | |
|---|---|---|
| DE | 1939042 | 2/1970 |
| DE | 19731961 | 1/1999 |
| EP | 0397036 | 11/1990 |
| EP | 0485637 | 5/1992 |
| EP | 0822218 | 2/1998 |
| EP | 1020494 | 7/2000 |
| EP | 1057847 | 12/2000 |
| JP | 8208426 | * 8/1996 |

* cited by examiner

*Primary Examiner*—Margaret G. Moore
(74) *Attorney, Agent, or Firm*—Charles Richard; Alan Zombeck

(57) ABSTRACT

There are disclosed silicone polyether compositions, methods for making them and their uses. The compositions are based on polyethers initiated by non-isomerizing alkenyl or alkynyl alcohols.

10 Claims, No Drawings

CERTAIN SILICONE POLYETHERS, METHODS FOR MAKING THEM AND USES

CROSS-REFERENCE

This application is a continuation-in-part of U.S. patent application Ser. No. 09/756,440 filed Jan. 8, 2001 now abandoned.

FIELD OF THE INVENTION

This invention relates to certain novel silicone polyethers, and both methods for making and uses for them. More particularly, the invention relates to silicone polyethers based on novel polyethers initiated by certain non-isomerizing alkenyl or alkynyl alcohols, methods for making these silicone polyethers by hydrosilation, and their uses in personal care and other products.

BACKGROUND OF THE INVENTION

Silicone polyethers are used in many applications, notably as surfactants and in the preparation of personal care products, polyurethanes and paint, ink and coating formulations. They may be produced by hydrosilation of a polyether initiated by an aliphatically unsaturated alcohol with a silicone having a SiH functionality. The polyether used may be produced from various initiators and epoxides under the influence of a variety of catalysts. Selection of the exact starting materials and routes utilized is important in determining the properties of the final polymer with even small changes producing very dramatic differences at times. The synthesis chosen for the polyether may be the most critical choice.

Bennett in U.S. Pat. Nos. 3,957,843 and 4,059,605 describes silicone based polyethers made using polyethers initiated by alkenyl alcohols. The polyethers were formed with a KOH catalyst. Japanese application, JP8-208426, appears to make a similar disclosure. Polymers such as these, especially those prepared from tertiary alcohols, are known to exhibit high polydispersity and at least those with polyethers based on ethylene oxide will tend to be waxes as opposed to liquids.

Alkynyl alcohol initiated polyethers are difficult if not impossible to make using a basic catalyst as there tends to be decomposition of the product, and there is also the issue of migration of the triple bond. Use of Lewis acids solves these problems to some extent, but results in formation of large amounts of difficult to remove byproducts and cyclization of the polyethers. An example in the art showing use of a Lewis acid catalyst in this context is U.S. Pat. No. 3,644,535 to Batty et al., while U.S. Pat. No. 5,066,756 to Raleigh et al. mentions use of acid and basic catalysts.

Use of metal cyanide type catalysts instead of conventional basic or Lewis acid catalysts may improve the situation. Use of cyanide and acid catalysts are described by Burkhart et al. in U.S. Pat. No. 5,391,679 for certain specific situations; the silicone was attached to the alcohol first to form the initiator. A similar initiator is described by Watabe et al. in EP 0485637 along with a metal cyanide catalyst, as well as fluorinated polyethers. Jorgenson et al. in U.S. Pat. Nos. 5,877,268 and 5,856,369 describe use of a metal cyanide catalyst focusing mostly on allyl and methallyl alcohol initiated polyethers; use of metal cyanide catalyst is criticized in some cases there, however.

Harper et al. in U.S. Pat. No. 4,877,906 describes a method of removing metal cyanide catalysts from polyethers after their formation.

There is a need for new silicone based polyethers, perhaps especially those with multi-functionality and/or low polydispersity. This invention is directed to this need among others.

SUMMARY OF THE INVENTION

It is an object of the present invention to provide new silicone based polyethers. Thus, the invention relates to a silicone based polyether comprising a monovalent group, R, with R having an average formula:

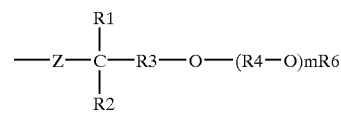

wherein, Z is bonded to Si and -Z- is —CH2CH2— or —CH=CH—;

R1 and R2 are independently alkyl, phenyl, an alkyl substituted phenyl, a phenyl substituted alkyl, one of the four latter groups substituted or further substituted by one or more of halogen, NO2, NH2 or an amine group whenever -Z- is —CH2CH2—, or R1 and R2 are independently H, halogen, NO2, NH2, an amine group, alkyl, phenyl, an alkyl substituted phenyl, a phenyl substituted alkyl, one of the four latter mentioned groups substituted or further substituted by one or more of halogen, NO2, NH2 or an amine group whenever -Z- is —CH=CH—, and regardless of choice of -Z-, R1 and R2 may be independently aldehyde, keto or ester functional;

R3 is a divalent hydrocarbon group which may be substituted by one or more of halogen, NO2, NH2 or an amine group, or R3 is a nullity;

R4 is —CH(R5)—CH2—, —CH2—CH(R5)— or a combination of these;

R5 is H, methyl, ethyl, phenyl or may vary among these within the same molecule in any proportion or order, with the proviso that when -Z- is —CH2CH2—, R1 and R2 are free of halogen and nitrogen, and all R5 groups are solely some combination of H and methyl, then —CH2CH2— groups must make up on average at least 60 percent by weight of the total R4 groups per molecule;

m=3 to 100 with the proviso that the range for m is expanded to 1 to 100 whenever -Z- is —CH2CH2— and the equivalent polydispersity of R is less than 1.4 or whenever R contains halogen, NO2, NH2, an amine group, or is aldehyde, keto or ester functional;

R6 is H, an alkyl group or

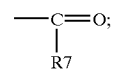

and

R7 is an alkyl group.

More specifically, the invention relates to a polymer of average formula:

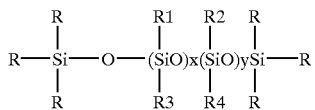

wherein R, R1, R2 and R3 are independently alkyl groups having 30 carbons or less or phenyl;

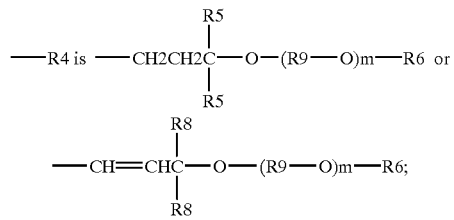

x is 0 to 500;
y is 1 to 100;
m is 3 to 100;
R5 is an alkyl group;
R6 is H, an alkyl group or C(O)R7;
R7 is an alkyl group;
R8 is H or an alkyl group;
R9 is CH(R10)CH2, CH2CH(R10) or a combination of these;
R10 is H, methyl, ethyl or phenyl; and
the equivalent polydispersity of R4 is less than 1.4.

Similarly the invention relates to a polymer of average formula:

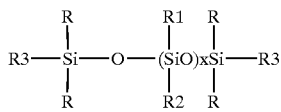

wherein R, R1 and R2 are independently alkyl groups having 30 carbons or less or phenyl;

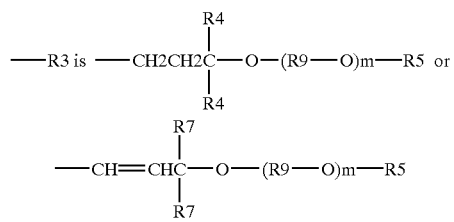

x is 0 to 500;
m is 3 to 100;
R4 is an alkyl group;
R5 is H, alkyl or C(O)R6;
R6 is an alkyl group;
R7 is H or an alkyl group;
R9 is CH(R10)CH2, CH2CH(R10) or a combination of these;
R10 is H, methyl, ethyl or phenyl; and
the equivalent polydispersity of R3 is less than 1.4.

It is a further object of the present invention to provide a method for making these silicone based polyethers. Thus, the invention relates to a method for making a silicone based polyether, the method comprising:

hydrosilating U with a silicone containing an SiH group, where

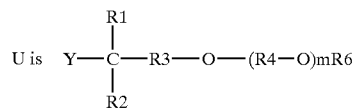

wherein, Y— is CH2=CH— or CH≡C—;

R1 and R2 are independently alkyl, phenyl, an alkyl substituted phenyl, a phenyl substituted alkyl, one of the four latter groups substituted or further substituted by one or more of halogen, NO2, NH2 or an amine group whenever Y— is CH2=CH—, or R1 and R2 are independently H, halogen, NO2, NH2, an amine group, alkyl, phenyl, an alkyl substituted phenyl, a phenyl substituted alkyl, one of the four latter mentioned groups substituted or further substituted by one or more of halogen, NO2, NH2 or an amine group whenever Y— is —CH≡C—, and regardless of choice of Y—, R1 and R2 may be independently aldehyde, keto or ester functional;

R3 is a divalent hydrocarbon group which may be substituted by one or more of halogen, NO2, NH2 or an amine group, or R3 is a nullity;

R4 is —CH(R5)—CH2—, —CH2—CH(R5)— or a combination of these;

R5 is H, methyl, ethyl, phenyl or may vary among these within the same molecule in any proportion or order, with the proviso that when Y— is CH2=CH—, R1 and R2 are free of halogen and nitrogen, and all R5 groups are solely some combination of H and methyl, then —CH2CH2— groups must make up on average at least 60 percent by weight of the total R4 groups per molecule;

m=3 to 100 with the proviso that the range for m is expanded to 1 to 100 whenever Y— is CH2=CH— and the equivalent polydispersity of U is less than 1.4 or whenever U contains halogen, NO2, NH2, an amine group, or is aldehyde, keto or ester functional;

R6 is H, an alkyl group or

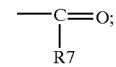

and

R7 is an alkyl group.

Another object of the present invention is to provide uses for subject silicone based polyethers. Thus, the invention further relates to methods for reducing surface tension. The present invention also relates to surfactants and paint, ink and coating formulations, personal care products for treating hair, skin and underarms, as well as polyurethane foams that contain the subject silicone based polyethers.

DETAILED DESCRIPTION OF THE INVENTION

The compositions according to the present invention include silicone based polyethers comprising a monovalent group, R, with R having an average formula:

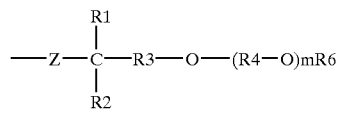

wherein, Z is bonded to Si and -Z- is —CH2CH2— or —CH=CH—;

R1 and R2 are independently alkyl, phenyl, an alkyl substituted phenyl, a phenyl substituted alkyl, one of the four latter groups substituted or further substituted by one or more of halogen, NO2, NH2 or an amine group whenever -Z- is —CH2CH2—, or R1 and R2 are independently H, halogen, NO2, NH2, an amine group, alkyl, phenyl, an alkyl substituted phenyl, a phenyl substituted alkyl, one of the four latter mentioned groups substituted or further substituted by one or more of halogen, NO2, NH2 or an amine group whenever -Z- is —CH=CH—, and regardless of choice of -Z-, R1 and R2 may be independently aldehyde, keto or ester functional;

R3 is a divalent hydrocarbon group (such as aliphatic, including alkyl, alkenyl, alkynyl based whether linear or cyclic, aromatic or combinations thereof) which may be substituted by one or more of halogen, NO2, NH2 or an amine group, or R3 is a nullity;

R4 is —CH(R5)—CH2—, —CH2—CH(R5)— or a combination of these;

R5 is H, methyl, ethyl, phenyl or may vary among these within the same molecule in any proportion or order, with the proviso that when -Z- is —CH2CH2—, R1 and R2 are free of halogen and nitrogen, and all R5 groups are solely some combination of H and methyl, then —CH2CH2— groups must make up on average at least 60 percent by weight of the total R4 groups per molecule;

m=3 to 100 with the proviso that the range for m is expanded to 1 to 100 whenever -Z- is —CH2CH2— and the equivalent polydispersity of R is less than 1.4 or whenever R contains halogen, NO2, NH2, an amine group, or is aldehyde, keto or ester functional;

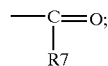

R6 is H, an alkyl group or and

R7 is an alkyl group.

In this specification and the claims that follow, no specific stereospecificity is intended in the depictions of any chemical structures, unless otherwise noted.

In this specification and the claims that follow "nullity" as in "R3 is a nullity" should be taken to mean that group referred to is absent. For example, if R3 is a nullity in —CH2—R3—O—, then this structure is —CH2-O—.

As used to describe chemical structures in this specification and claims that follow, "halogen" should be taken to mean a member of the group consisting of fluorine, chlorine, bromine, iodine and others of this series with chlorine and bromine being preferred. Similarly, "amine group" in this same context, should be taken to mean a monovalent group containing nitrogen bonded to at least one organic carbon such as —NHCH3 or —CH2-NH—CH3.

Halogen and NO2 containing polymers according to this invention may be desirable for themselves or because they may be converted to NH2 containing polymers by methods such as simple exchange with ammonia or reduction, respectively. These functional groups along with aldehyde, keto and ester functionality can enhance the properties of the simpler polymers of this invention or provide reactive sites for various purposes. Even multifunctional polymers are possible and are often quite desirable in many applications.

In applications such as personal care, it is often desirable that silicone based polyethers be fully liquid at "room temperature" (25 deg C. and 760 mm Hg pressure) as even partial solidification can result in products that are unsightly messes. For this and other reasons, especially when the polyether portion of the polymer is derived to a large extent from ethylene oxide, lower molecular weight polymers are preferred. In most cases, this translates to an weight average molecular weight for the overall polymer to be less than 10,000 and the equivalent, weight average molecular weight for the polyether/initiator portion to be less than 700. By equivalent in this context is meant that this weight is based on the subject polymer side chains (polyether/initiator) as if they were separate molecules.

For similar quality control reasons, among others, it is desirable that the polydispersity of the overall polymers of the present invention not be very high. Practically speaking, this is usually determined by the polyether/initiator chains. Equivalent polydispersities of the these chains (determined as if these chains were separate molecules) should usually be less 1.6, preferably less than 1.4, more preferably less than 1.25 or less than 1.1 and most preferably less than 1.05 or lower (down to 1.0). These numerical ranges would apply to the polydispersity of the overall silicon based polyether as well.

Some embodiments of the compositions according to the present invention that are of great interest include polymers of average formula:

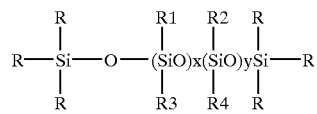

wherein R, R1, R2 and R3 are independently alkyl groups having 30 carbons or less or phenyl, preferably methyl;

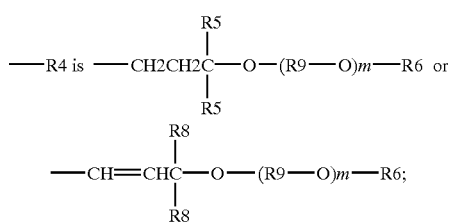

x is 0 to 500;
y is 1 to 100;
m is 3 to 100;
R5 is an alkyl group, preferably methyl;
R6 is H, an alkyl group or C(O)R7;
R7 is an alkyl group;
R8 is H or an alkyl group, preferably methyl;
R9 is CH(R10)CH2, CH2CH(R10) or a combination of these;
R10 is H, methyl, ethyl or phenyl, preferably H; and
the equivalent polydispersity of R4 is less than 1.4.

In this embodiment, the structural units designated with x and y are not necessarily intended as being in blocks as might be implied. That is, these units may be in any order in the chain (except at the ends) as long as there are x and y of each, respectively, on average.

Other embodiments of the compositions according to the present invention that are of great interest include polymers of average formula:

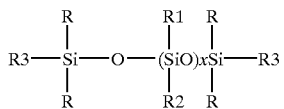

wherein R, R1 and R2 are independently alkyl groups having 30 carbons or less or phenyl, preferably methyl;

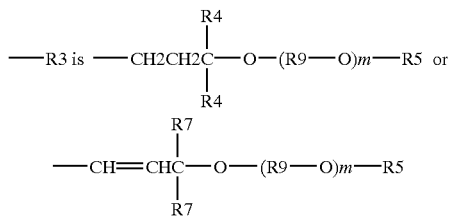

x is 0 to 500;
m is 3 to 100;
R4 is an alkyl group, preferably methyl;
R5 is H, alkyl or C(O)R6;
R6 is an alkyl group;
R7 is H or an alkyl group, preferably methyl;
R9 is CH(R10)CH2, CH2CH(R10) or a combination of these;
R10 is H, methyl, ethyl or phenyl, preferably H; and
the equivalent polydispersity of R3 is less than 1.4.

The methods according to the present invention include those for making silicone based polyethers, such methods including those comprising: hydrosilating U with a silicone containing an SiH group, where

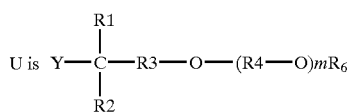

wherein, Y— is CH2=CH— or CH≡C—;
R1 and R2 are independently alkyl, phenyl, an alkyl substituted phenyl, a phenyl substituted alkyl, one of the four latter groups substituted or further substituted by one or more of halogen, NO2, NH2 or an amine group whenever Y— is CH2=CH—, or
R1 and R2 are independently H, halogen, NO2, NH2, an amine group, alkyl, phenyl, an alkyl substituted phenyl, a phenyl substituted alkyl, one of the four latter mentioned groups substituted or further substituted by one or more of halogen, NO2, NH2 or an amine group whenever Y— is —CH≡C—, and regardless of choice of Y—,
R1 and R2 may be independently aldehyde, keto or ester functional;
R3 is a divalent hydrocarbon group (which may be particularly groups as defined for the corresponding invented compositions above) which may be substituted by one or more of halogen, NO2, NH2 or an amine group, or R3 is a nullity;
R4 is —CH(R5)—CH2—, —CH2—CH(R5)— or a combination of these;
R5 is H, methyl, ethyl, phenyl or may vary among these within the same molecule in any proportion or order, with the proviso that when Y— is CH2=CH—, R1 and R2 are free of halogen and nitrogen, and all R5 groups are solely some combination of H and methyl, then —CH2CH2— groups must make up on average at least 60 percent by weight of the total R4 groups per molecule;
m=3 to 100 with the proviso that the range for m is expanded to 1 to 100 whenever Y— is CH2=CH— and the equivalent polydispersity of U is less than 1.4 or whenever U contains halogen, NO2, NH2, an amine group, or is aldehyde, keto or ester functional;
R6 is H, an alkyl group or

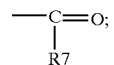

and
R7 is an alkyl group.

The hydrosilation reaction is well known in the art. It is usually carried out in the presence of a catalyst such as one based on platinum which are also well known in the art, some examples of which are described below.

As was explained for the equivalent polydispersity of the polyether/initiator side chains in the overall polymer according to the present invention, that for its (possible) precursor (referred to above as "U") correspondingly should usually be less than 1.6, preferably less than 1.4, more preferably less than 1.25 or less than 1.1 and most preferably less than 1.05 or lower (down to 1.0). This polydispersity should be understood to include impurities that are added along with U to the hydrosilation reaction mixture, but these ranges may apply to U alone.

It is preferred that U be of high purity for hydrosilation. U should be greater than 85 weight percent, preferably U should be greater than 92 weight percent and most preferably U should be greater than 96 weight percent of the material containing U added to the hydrosilation reaction mixture.

It is of note that the initiators for the polyethers used in making the polymers according to the present invention are, at least for the most part, alcohols that contain unsaturated groups that do not (at least usually do not) isomerize. This results in lower odor polymers as it is less likely that smelly products like propionaldehyde will form from them. It is also very efficient to use 1:1 stoichiometric ratios for polyether:silicone in the present hydrosilations in many cases, particularly when using polyethers at lower polydispersities.

These factors promote production of high purity silicone based polyethers (even directly without further or much further purification) which is very important in many applications such as personal care. It is possible to get products of much higher clarity which is of special concern especially in the case where polyethers with longer chains formed mostly from ethylene oxide are concerned. Here, especially at higher polydispersity, higher molecular weight molecules can solidify, ruining clarity.

The polyether precursors of the silicone based polyethers of the present invention are prepared by a process comprising forming a mixture of an initiator compound having one or one oxyalkylatable groups, at least one alkylene oxide and a metal cyanide catalyst complex and in the absence of a polymerization inhibitor, and subjecting the mixture to conditions sufficient to activate the catalyst complex and to alkoxylate the oxyalkylatable groups of the initiator, wherein the initiator compound contains nonconjugated, carbon-carbon unsaturation that is (a) migratable, (b) adjacent to a hydroxyl-substituted tertiary carbon atom, or (c) bath (a) and (b); and wherein the polyethers so prepared have an average molecular weight of up to 6000. The polyether precursors of the silicone based polyethers or the present invention are described,in co-pending application assigned to the Dow Chemical Company and these and those derived from them are incorporated by reference. These applications are:

PCT/US00/18619, "Method for Fractionating Poly(ethylene oxide) Formed Using Metallic Cyanide Catalyst", filed Jul. 7,2000 and published on Jan. 18, 2001 as WO 01/04184 A1.

PCT/US00/18621), "Polymerization of Alkylene Oxides Using Metal Cyanide Catalysts and Unsaturated Initiator Compounds", filed Jul. 7, 2000 and published on or after Jan. 18, 2001 as WO 01/04178 A1 and corresponds to U.S. Pat. No. 6,355,845 A1;

PCT/US00/1 8621, "Polymerization of Alkylene Oxides Onto Functionalized Initiators", filed Jul. 7, 2000 and published on Jan. 18, 2001 as WO 01/04179;

PCT/US00/18664, "Polymerization of Ethylene Oxide Using Metal Cyanide Catalysts", filed Jul. 7, 2000 published on Jan. 18, 2001 as WO 01/04183.

Metal cyanide catalysts are suited for making the polyethers used to produce the silicone polyethers of the present invention as has been noted previously. This may be especially true when it is desired to have base sensitive groups in the polyether. One form of these catalysts (referred to in this specification and the claims that follow as "DMC catalyst") is:

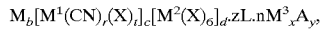

$$M_b[M^1(CN)_r(X)_t]_c[M^2(X)_6]_d \cdot zL \cdot nM^3_xA_y,$$

wherein M is a metal ion that forms an insoluble precipitate with the $M^1(CN)_r(X)_t$ group and which has at least one water or organic solvent soluble salt;
$M^1$ and $M^2$ are transition metal ions that may be the same or different;
each X independently represents a group other than cyanide that coordinates with an $M^1$ or $M^2$ ion;
L represents an organic complexing agent;
$M^3_xA_y$ represents a water or organic solvent soluble salt of metal ion $M^3$ and anion A, wherein $M^3$ is the same as or different than M;
b and c are positive numbers that together with d, reflect an electrostatically neutral complex;
d is zero or a positive number;
x and y are numbers that reflect an electrostatically neutral salt;
r is from 4 to 6, t is from 0 to 2 and it is preferred that r+t=6;
z is zero or a positive number and n is a positive number indicating the relative quantities of
the complexing agent L and of the metal salt, $M^3_xA_y$, respectively.

Some particular DMC catalysts of interest include:
zinc hexacyanocobaltate.zL.n $ZnCl_2$,
zinc hexacyanocobaltate.zL.n $LaCl_3$,
zinc hexacyanocobaltate.zL.n $CrCl_3$,
magnesium hexacyanocobaltate.zL.n $CrCl_2$,
magnesium hexacyanocobaltate.zL.n $LaCl_3$, and
magnesium hexacyanocobaltate.zL.n $CrCl_3$, where L is tertiary butanol, a polyether polyol, 1,2-dimethoxyethane or combinations thereof.

General methods to prepare these catalysts are well known in the art with specifics given in the PCT applications noted above.

These catalysts may be insoluble in nonpolar solvents like n-hexane, while the polyethers may be soluble, thus this can be useful in removing the catalyst from the polyether product. Other methods for catalyst removal have been previously described or noted.

Another method according to the present invention is a method to reduce the surface tension of a system comprising adding a silicone based polyether of the present invention to the system or a component or components used to produce the system.

Other compositions according to the present invention include those that are also manufactures that contain silicone based polyethers of the present invention. Examples of these manufactures include surfactants (which could be made solely of a silicone based polyether), personal care products such as treatments for hair, skin or underarms and paint, ink or coating formulations that contain these silicone polyethers, as well as polyurethane foams containing such polyethers as a stabilizer or otherwise.

Note that polydispersities given in the examples to follow were, and those referred to elsewhere may be, determined (while equivalents may be found based on corresponding polyethers or the like) by gel permeation chromatography ("GPC") using the following procedure.

Polydispersity was determined using GPC with a differential refractometer. Samples were prepared by dissolving them in tetrahydrofuran with analysis under the following conditions:
Column: PL-gel Mixed E
Eluent: tetrahydrofuran
Flow: 1 ml/min
Temperature: 40 deg C.
Concentration: 0.25%
Injection volume: 150 microliters
Calibration: Polymer Laboratories Polyethylene Glycol Calibrants.

Note that in this disclosure and the claims that follow that "Me" in a chemical formula means "methyl" or "—CH3", unless otherwise indicated.

EXAMPLES

Titles for the examples should not be taken as limiting in any way, but merely illustrative.

Example 1

An Alkynyl Alcohol Initiated Polyether

A zinc hexacyanocobaltate/t-butanol/450 MW poly(propylene oxide) triol catalyst complex (3.40 g) and 216.40 g of 2-methyl-3-butyn-2-ol are charged to a 2 gallon (7.57 liter) reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (100 g) is added. After one hour, feed of ethylene oxide is started and is fed for 2.5 hours. A total of 845 g ethylene oxide is added. The yield is 1000 g of a light yellow liquid which became opaque (white) upon standing overnight but remained fluid. GPC (gel permeation chromatography) analysis shows the product to have a number average molecular weight, "$M_n$", of 445, and a polydispersity of 1.25. $C^{13}$ NMR analysis showed that some starting material remains in the product.

Example 2

Alkenyl Alcohol Initiated Polyethers (a) A zinc hexacyanocobaltate/t-butanol/450 MW poly (propylene oxide) triol catalyst complex (6.0 g) and 271.87 g of 2-methyl-3-buten-2-ol are charged to a 2 gallon (7.57 liter) reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (135 g) is added. After thirty minutes, an additional 50 g of ethylene oxide is added. After another 90 minutes, another 50 g of ethylene oxide is added. About two hours after that, an ethylene oxide feed to the reactor is begun, starting at 1 g/min and gradually increasing to 4 g/min and then decreasing to 3.5 g/min, until a total of 1105 g ethylene oxide has been added. The yield is 1260 g of a very light colored liquid which became opaque (white) upon standing overnight but remained fluid. GPC (gel permeation chromatography) analysis shows the product to have a number average molecular weight, "$M_n$", of 380, with a main fraction at $M_n$ 360 (polydispersity of 1.31) and a small fraction at $M_n$ 1560 (polydispersity of 1.03). Overall polydispersity for the crude polyether is 1.37. $C^{13}$ NMR analysis showed that some starting material remains in the product.

(b) A zinc hexacyanocobaltate/t-butanol/450 MW poly (propylene oxide) triol catalyst complex (0.53 g) and 235.05 g of 2-methyl-3-buten-2-ol are homogenized and charged under nitrogen to a 2 gallon (7.57 liter) reactor, taking care to transfer all of the catalyst complex into the reactor. The reactor is sealed and degassed/purged several times with nitrogen, with the pressure being maintained above atmospheric pressure at all times to prevent loss of initiator. The mixture is stirred and heated to 90° C. A portion of ethylene oxide (about 50-150 g) is added. When the pressure in the reactor drops, indicating the start of polymerization, a feed of ethylene oxide is begun. The feed rate is varied until a constant reactor pressure is obtained. A total of 2165 g of ethylene oxide is added. As the reaction progresses, a vigorous exotherm develops. The product has a $M_n$ of 940 via GPC and a polydispersity of approximately 1.1.

Example 3

A Polyether with Halogenated Initiator

A polyether may be prepared using the same general procedure as described in Example 1 with 1-chloro-2-methyl-3-butyn-2-ol as the initiator. (Corresponding substituted or functionalized polyethers such as NO2 and NH2 containing or keto functionalized can be made similarly from corresponding initiators and a similar procedure.)

Exsample 4

A Silicone Based Polyether 47.7 g of a polysiloxane hydride having the average structure $Me_3Si(OSiMe_2)_{8.7}(OSiMeH)_{3.7}OSiMe_3$ was combined with 104.6 g of a polyethyleneoxide having the average structure $H_2C=CHC(Mc)_2(OCH_2CH_2)_{9.75}OH$ (having a polydispersity of about 1.2 as determined by GPC), 15 g of isopropyl alcohol and 0.05 g of potassium acetate. This mixture was heated to 89 deg C. and enough chloroplatinic acid was added to give 8.9 ppm of platinum. Thereafter the mixture was heated between 89 and 103 deg C. for 6 hours during which time the system became clear. Analysis by FTIR (Fourier transform infrared spectroscopy) indicated that all of the SiH had reacted. The product was stripped to 150 deg C at a reduced pressure of 10 mm of Hg to give 147.1 g of clear copolymer; refractive index was 1.4519.

Example 5

A Silicone Based Polyether 29.9 g of $(Me_3SiO)_2SiMeH$ was combined with 50.0 g of a polyethyleneoxide having the average structure $HC\equiv CC(Me)_2(OCH_2CH_2)_{6.60}OH$ (having a polydispersity of about 1.2 as determined by GPC), 15 g of isopropyl alcohol and 0.05 g of sodium acetate. This mixture was warmed to 90 deg C. and catalyzed with two drops of 4 weight percent chloroplatinic acid. These conditions were maintained for about 9 hours during which SiH levels fell to about 12 ppm. The product was devolatilized to a condition of 105 deg C. at a pressure of 5 mm Hg to give 74.1 g of copolymer; refractive index was 1.4480. Generation of a Gibb's Plot indicated a CMC (critical micelle concentration) of 4.64E-03 weight percent and a surface tension at CMC of 21.58 dynes/cm.

Example 6

A Silicone Based Polyether 85 g of a polysiloxane hydride having the average structure $HMe_2Si(OSiMe_2)_{13}OSiMe_2H$ was combined with 50 g of a polyethyleneoxide having the average structure $HC\equiv CC(Me)_2(OCH_2CH_2)_{6.60}OH$ (having a polydispersity of about 1.2 as determined by GPC), 0.05 g of sodium acetate and 34 g of isopropyl alcohol. This mixture was heated to 83 deg C. with enough chloroplatinic acid in isopropyl alcohol to give a level of 12 ppm of platinum metal. After 5 hours the level of SiH had been reduced to 7 ppm whereafter the product was devolatilized to a condition of 105 deg C. and a pressure of 5 mm Hg giving 132 g of copolymer; refractive index was 1.4318.

Example 7

A Silicone Based Polyether 23.3 g of $(Me_3SiO)_2SiMeH$ was combined with 50.0 g of a polyethyleneoxide having the average structure $H_2C\!=\!CHC(Me)_2(OCH_2CH_2)_{10.1}OH$ (having a polydispersity of about 1.2 as determined by GPC), 0.05 g of potassium acetate and 20 g of toluene. This mixture was heated to 85 deg C. and catalyzed with enough 4 weight percent chloroplatinic acid to give a platinum level of 16 ppm. Temperatures of 85 deg C. to 105 deg C. were maintained for four hours. The copolymer was devolatilized at 100 deg C. at a pressure of 5 mm Hg to give 70.1 g of product; refractive index was 1.4474. Generation of a Gibb's Plot indicated a CMC of 5.08E-03 weight percent and a surface tension at CMC of 21.89 dynes/cm.

Example 8

A Silicone Based Polyether 34.1 g of a polysiloxane hydride having the average structure $Me_3Si(OSiMe_2)_{8.7}(OSiMeH)_{3.7}OSiMe_3$ was combined with 50.0 g of a polyethyleneoxide having the average structure $HC\!\equiv\!CC(Me)_2(OCH_2CH_2)_{6.60}OH$ (having a polydispersity of about 1.2 as determined by GPC), 15 cm³ of toluene, 20 cm³ of isopropyl alcohol and 0.05 g of potassium acetate. These were heated to 95 deg C. with sufficient chloroplatinic acid to give 19 ppm platinum. After 6 hours of heating the product was devolatilized at 105 deg C. at a pressure of 5 mm Hg to give 81.2 g of copolymer; index of refraction was 1.4520. Gibb's Plot data included a CMC of 1.36E-03 weight percent and a surface tension at CMC of 24.24 dynes/cm.

Example 9

A Silicone Based Polyether 64.0 g of a polysiloxane hydride having the average structure $HMe_2Si(OSiMe_2)_{13}OSiMe_2H$ was combined with 57.6 g of a polyethyleneoxide having the average structure $H_2C\!=\!CHC(Me)_2(OCH_2CH_2)_{9.93}OH$ (having a polydispersity of about 1.2 as measured using GPC), 0.05 g of potassium acetate and 15 g of isopropyl alcohol. This mixture was heated to 90 deg C. and enough chloroplatinic acid was added to give a platinum level of 15 ppm. These conditions were maintained for 3 hours giving a clear copolymer which was devolatilized at 105 deg C. at a pressure of 10 mm Hg to give 118.1 g of product; index of refraction was 1.4355.

Example 10

A Silicone Based Polyether With Halogenated Initiator

A silicone based polyether may be prepared using the general procedure of Example 4 with $H_2C\!=\!CHC(CH_2Br)_2(OCH_2CH_2)_{9.75}OH$ as the starting polyether. (Corresponding substituted or functionalized silicone based polyethers such as NO2 and NH2 containing or keto functionalized can be made similarly from corresponding polyethers and a similar procedure.)

The terms "average structure" and "average formula" when used in this specification and the claims that follow should be understood to be number or equivalently molar averages, unless otherwise stated.

Ranges given in this specification and the claims that follow, whether numerical or otherwise, should be understood, unless otherwise stated, to specifically specify and disclose all elements subsumed in addition to the endpoints. For example, a disclosure of 1-3 should be understood to specifically disclose 1.4, 2, 2.6, and other numbers subsumed within the range, as well as 1 and 3; a disclosure of C1 to C3 alkyl should be understood to specifically disclose ethyl, as well as methyl and propyl. A disclosure of alkyl correspondingly discloses methyl, ethyl, propyl and the like specifically. "Up to" and "less than" should be taken to function as ranges for purposes of this definition, even though only one endpoint is explicitly given with the other (if any) taken from the context.

The specific embodiments of the present invention given previously are intended as illustrative and should not be interpreted as limiting the claims unless stated otherwise.

That which is claimed is:

1. A silicone based polyether comprising a monovalent group, R, with R having an average formula:

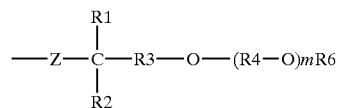

wherein, Z is bonded to Si and -Z- is —$CH_2CH_2$— or —CH=CH—;

whenever -Z- is —$CH_2CH_2$—
R1 and R2 are independently alkyl, phenyl, an alkyl substituted phenyl, a phenyl substituted alkyl, or one of the four latter groups substituted by one or more of halogen, $NO_2$, or amine group, or whenever -Z- is —CH=CH—
R1 and R2 are independently H, halogen, $NO_2$, an amine group, alkyl, phenyl, an alkyl substituted phenyl, a phenyl substituted alkyl, or one of the four latter groups substituted by one or more of halogen, $NO_2$, or amine group, and regardless of choice of -Z-
R1 and R2 may be independently aldehyde, keto or ester functional;
R3 is a divalent hydrocarbon group which may be substituted by one or more of halogen, $NO_2$, or amine group, or R3 is a nullity;
R4 is —CH(R5)—$CH_2$—, —$CH_2$—CH(R5)— or a combination of these;
R5 is H, methyl, ethyl, phenyl or may vary among these within the same molecule in any proportion or order;
with the proviso that when -Z- is —$CH_2CH_2$—, R1 and R2 are free of halogen and nitrogen, and all R5 groups are solely some combination of H and methyl, then —$CH_2CH_2$— groups must make up on average at least 60 percent by weight of the total R4 groups per molecule;
m=3 to 100 with the proviso that the range form is expanded to 1 to 100 whenever -Z- is —$CH_2CH_2$— and the equivalent polydispersity of R is less than 1.4 or whenever R contains halogen, $NO_2$, an amine group, or is aldehyde, keto or ester functional;

R6 is H, an alkyl group or

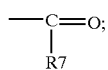

and

R7 an alkyl group, whereby the equivalent polydispersity of R is less than 1.6, and wherein at least one of R1, R2 and R3 is chlorine, bromine, chlorine substituted, or bromine substituted.

2. The silicone based polyether according to claim 1, wherein -Z- is —$CH_2CH_2$—.

3. The silicone based polyether according to claim 1, wherein -Z- is —CH=CH—.

4. The silicone based polyether according to claim 1, wherein R5 is all H.

5. The silicone based polyether according to claim 1, wherein the weight average molecular weight of the silicone based polyether is less than 10,000 and the weight average equivalent weight of R is less than 700.

6. The silicone based polyether according to claim 1 that exists as a liquid at 25 deg C. and 760 mm Hg pressure.

7. The silicone based polyether according to claim 1, wherein the equivalent polydispersity of R is less than 1.4.

8. The silicone based polyether according to claim 1, wherein the equivalent polydispersity of R is 1.25 or less.

9. A method for making a silicone based polyether, the method comprising preparing a polyether by a process comprising forming a mixture of an initiator compound having one or one oxyalkylatable groups, at least one alkylene oxide and a metal cyanide catalyst complex and in the absence of a polymerization inhibitor, and subjecting the mixture to conditions sufficient to activate the catalyst complex and to alkoxylate the oxyalkylatable groups of the initiator, wherein the initiator compound contains nonconjugated, carbon-carbon unsaturation that is (a) migratable, (b) adjacent to a hydroxyl-substituted tertiary carbon atom, or (c) both (a) and (b); and wherein the polyethers so prepared have an average molecular weight of up to 6000: and hydrosilylating the polyether with a silicone containing an SiH group.

10. The method of claim 9, wherein U contains chlorine, bromine, $NO_2$, or an amine group.

* * * * *